US012304002B2

(12) United States Patent
Subkhangulov et al.

(10) Patent No.: US 12,304,002 B2
(45) Date of Patent: May 20, 2025

(54) LASER-CUTTING USING SELECTIVE POLARIZATION

(71) Applicant: ASMPT SINGAPORE PTE. LTD., Singapore (SG)

(72) Inventors: Ruslan Rifovich Subkhangulov, Nijmegen (NL); Paul Christiaan Verburg, Nijmegen (NL); Denis Danisovich Arslanov, Utrecht (NL); Roman Urs Doll, Nijmegen (NL)

(73) Assignee: ASMPT SINGAPORE PTE. LTD. (SG)

( * ) Notice: Subject to any disclaimer, the term of this patent is extended or adjusted under 35 U.S.C. 154(b) by 902 days.

(21) Appl. No.: 17/482,566

(22) Filed: Sep. 23, 2021

(65) Prior Publication Data

US 2022/0009035 A1    Jan. 13, 2022

Related U.S. Application Data

(62) Division of application No. 15/820,782, filed on Nov. 22, 2017, now abandoned.

(51) Int. Cl.
*B23K 26/364* (2014.01)
*B23K 26/06* (2014.01)
(Continued)

(52) U.S. Cl.
CPC .......... *B23K 26/364* (2015.10); *B23K 26/064* (2015.10); *B23K 26/0643* (2013.01); *B23K 26/38* (2013.01); *B23K 2103/56* (2018.08)

(58) Field of Classification Search
CPC ............ B23K 2103/56; B23K 26/0624; B23K 26/0648; B23K 26/064; B23K 2103/50; B23K 26/40; B23K 26/0006; B23K 26/0853; B23K 26/364; B23K 26/38; B23K 26/0643; B23K 26/0665; B23K 26/067; B23K 26/06; B23K 26/53; B23K 26/0608; B23K 26/0613; B23K 26/0823;
(Continued)

(56) References Cited

U.S. PATENT DOCUMENTS

| 4,707,584 A | 11/1987 | Kimbara | 219/121.67 |
| 4,866,243 A | 9/1989 | Sakane | 219/121.62 |

(Continued)

FOREIGN PATENT DOCUMENTS

| DE | 102015211426 | 12/2016 |
| EP | 1852948 | 11/2007 |

(Continued)

OTHER PUBLICATIONS

D.S. Finn et al., "Study of die break strength and heat-affected zone for laser processing of thin silicon wafers," Journal of Laser Applications, vol. 27, No. 3, pp. 032-004-1-032004-8, Aug. 2015.

*Primary Examiner* — Chris Q Liu
(74) *Attorney, Agent, or Firm* — OSTROLENK FABER LLP (57) ABSTRACT

A method of cutting a semiconductor wafer by selectively controlling and utilising the polarization of incident laser beam or beams that includes irradiating the semiconductor wafer with laser light having a first polarization state, and subsequently irradiating the semiconductor wafer with laser light having a second polarization state, the second polarization state being different from the first polarization state.

6 Claims, 6 Drawing Sheets

(51) Int. Cl.
*B23K 26/064* (2014.01)
*B23K 26/38* (2014.01)
*B23K 103/00* (2006.01)

(58) Field of Classification Search
CPC .......... B23K 26/0604; B23K 26/0622; B23K 26/0626; B23K 26/0676; B23K 26/032; B23K 26/082; B23K 26/0652; B23K 26/359; B23K 26/361; B23K 2103/52; B23K 26/00; B23K 26/0673; B23K 26/083; B23K 26/704; B23K 26/402; B23K 26/352; B23K 26/0869
USPC .......... 219/121.67, 121.72, 121.61, 121.83, 219/121.68, 121.71, 121.74, 121.75, 219/121.77, 121.62, 121.69, 121.7, 219/121.73, 121.76, 121.78, 121.8
See application file for complete search history.

(56) References Cited

U.S. PATENT DOCUMENTS

| | | | |
|---|---|---|---|
| 5,097,291 A | 3/1992 | Suzuki | 355/53 |
| 5,298,718 A | 3/1994 | Masuda | 219/121.72 |
| 6,518,540 B1 | 2/2003 | Wee | 219/121.61 |
| 9,312,178 B2 | 4/2016 | Van Der Stam et al. | |
| 9,460,922 B1 | 10/2016 | Ahn | |
| 2005/0274702 A1 | 12/2005 | Deshi | 219/121.72 |
| 2006/0039419 A1 | 2/2006 | Deshi | 372/9 |
| 2006/0228095 A1 | 10/2006 | Eda | 385/147 |
| 2008/0176147 A1 | 7/2008 | Wagner | 430/5 |
| 2010/0193484 A1 | 8/2010 | Chen | 219/121.72 |
| 2012/0061356 A1 | 3/2012 | Fukumitsu | 219/121.61 |
| 2012/0103952 A1 | 5/2012 | Nomaru | 219/121.67 |
| 2012/0199565 A1 | 8/2012 | Nomaru | 219/121.67 |
| 2013/0029093 A1 | 1/2013 | Wakioka | 428/131 |
| 2014/0054275 A1 | 2/2014 | Nakamae | 219/121.72 |
| 2014/0312015 A1 | 10/2014 | Kurachi | 219/121.71 |
| 2015/0034617 A1 | 2/2015 | Sawabe | 219/121.73 |
| 2015/0076518 A1 | 3/2015 | Tanigawa | 255/77 |
| 2015/0145981 A1 | 5/2015 | Anhut | 348/80 |
| 2015/0231738 A1 | 8/2015 | Ota | 219/121.71 |
| 2015/0273624 A1 | 10/2015 | Yoshida | 428/209 |
| 2016/0052090 A1 | 2/2016 | Tan Igawa | 219/121.69 |
| 2016/0067823 A1 | 3/2016 | Nomaru | 219/121.77 |
| 2016/0288250 A1 | 10/2016 | Hirata | |
| 2016/0332250 A1 | 11/2016 | Xu | |
| 2017/0072505 A1 | 3/2017 | Moffatt | |
| 2017/0087671 A1 | 3/2017 | Tanaka et al. | 219/121.67 |
| 2017/0219755 A1 | 8/2017 | Kameda | |
| 2018/0154482 A1 | 6/2018 | Jeong | |
| 2018/0154572 A1 | 6/2018 | Richter | |
| 2018/0339365 A1 | 11/2018 | Sampei | |

FOREIGN PATENT DOCUMENTS

| | | |
|---|---|---|
| JP | 2010-036196 | 2/2010 |
| JP | 2010-284669 | 12/2010 |
| JP | 2013-197108 | 9/2013 |
| WO | WO 97/29509 A1 | 8/1997 |

- s-polarization
- p-polarization

LASER-CUTTING USING SELECTIVE POLARIZATION

CROSS REFERENCE TO RELATED APPLICATION AND CLAIM OF PRIORITY

This application is a divisional application of, and claims priority to, U.S. patent application Ser. No. 15/820,782, filed on Nov. 22, 2017, entitled Laser-Cutting Using Selective Polarization. the entire disclosure of which is incorporated by this reference.

FIELD OF INVENTION

This invention relates to a method of cutting a semiconductor wafer, apparatus for performing such a method, and laser-cutting apparatus for cutting a semiconductor wafer.

BACKGROUND AND PRIOR ART

Singulation and scribing are well-known processes in the semiconductor industry, in which a cutting machine is used to work a workpiece or substrate such as a semiconductor wafer, which could for example comprise silicon but is not so limited. Throughout this specification, the term "wafer" is used to encompass all these products. In a singulation process (also referred to as dicing, severing, cleaving for example), a wafer is completely cut through such as to singulate the wafer into individual dies. In a scribing process (also referred to as grooving, scoring, gouging or furrowing for example), a channel or groove is cut into a wafer. Other processes may be applied subsequently, for example full singulation by using a physical saw along the cut channels. Alternatively or additionally, holes may be formed in a wafer using a drilling process. Throughout the present specification, the term "cutting" will be used to encompass singulation, scribing and drilling.

Silicon semiconductor wafers are conventionally of the order of 0.005 mm to 1 mm thick. The traditional singulation method uses a diamond saw, which works well for thick wafers of thicknesses down to about 0.1 mm or 100 μm, where physical constraints such as chipping, delamination and large kerf width are less demanding.

However, the overall semiconductor technology trend in miniaturization is to decrease the thickness of the wafer, and recently, semiconductor manufacturers have started to migrate to the use of "thin" wafers, which will here be defined as wafers having a thickness of less than 100 μM.

As wafer thicknesses decrease, it has been shown that laser technology becomes more advantageous for singulation than the use of a mechanical saw. Exploiting high-power lasers for such material processing has significant advantages in comparison with mechanical counterparts such as, for instance, drilling and sawing, and laser processing has a great versatility in coping with small and delicate workpieces.

Laser removal of the semiconductor material occurs due to a rapid temperature increase of a relatively small area in which the laser beam is focused, which causes local material to melt, explosively boil, evaporate and ablate. Laser singulation has challenging requirements, including the delicate balance between the process throughput and the workpiece (die) quality. The quality and throughput of the process are determined by laser parameters such as fluence, pulse width, repetition rate and wavelength.

It has been proposed to use a multiple beam laser cutting approach, for example in WO 1997/029509 A1, wherein a linear cluster of focused laser beams, which may be arranged in a linear array of laser spots, is used to ablate substrate material along a scribeline, thus causing the substrate to be radiatively scored along the line of ablation. The use of multiple beams in this manner as opposed to a single (more powerful) beam may provide various advantages, in particular a reduction in the level of defects created during the cutting process. The substrate material along a scribeline may be removed successively by multiple passes of such an array of focused spots, which may be of particular benefit for cutting thick wafers.

One of the quantitative assessments of the laser process quality is the die or wafer fracture strength, which determines a tensile stress at which the wafer breaks. Uniaxial flexure tests are commonly employed for the determination of fracture strength for brittle materials and have been adopted for wafer strength measurements. These tests include three- and four-point bending tests, which are commonly used to measure fracture strength.

It is believed that the fracture strength of the laser-separated wafers depends on the level of laser-induced defects such as micro-cracks and chip-outs present in the wafer. These defects are generated by a high stress at the interface between the bulk semiconductor material and the local laser-processed area. The high stress is produced by the rapid temperature increase in the processed area. The fracture strength is typically different for the front and back sides of the wafer, and indeed many current techniques lead to a back side strength which is much lower than the front side strength.

In order to improve wafer strength, the laser-processed areas (i.e. cut regions or simply "cuts") are separately treated in order to anneal or remove defects. Currently used post-treatment methods include wet etching, plasma treatment and laser irradiation. This latter method is particularly attractive since it potentially increases productivity and reduces costs.

U.S. Pat. No. 9,312,178 B2 discloses a means to anneal the side wall defects of the cut, which improves the wafer strength.

The present invention seeks to provide an improved laser cutting method, which may result in improved wafer or die strength.

In accordance with the present invention this aim is achieved by selectively controlling and utilising the polarization of the incident laser beam or beams.

SUMMARY OF THE INVENTION

In accordance with a first aspect of the present invention there is provided a method of cutting a semiconductor wafer, comprising the steps of:

a) providing a laser source for directing laser light to an irradiation region of a laser cutting apparatus, b) supporting the semiconductor wafer within the laser cutting apparatus such that the irradiation region is coincident with the semiconductor wafer, and c) irradiating the irradiation region of the semiconductor wafer with laser light having a first polarization state, and subsequently irradiating the irradiation region of the semiconductor wafer with laser light having a second polarization state, the second polarization state being different from the first polarization state.

In accordance with a second aspect of the present invention there is provided apparatus for performing the method of the first aspect.

In accordance with a third aspect of the present invention there is provided laser-cutting apparatus for cutting a semiconductor wafer, comprising:
a laser source for emitting a laser beam;
an optical guide system for receiving the laser beam and directing laser light to an irradiation region;
a selectively actuatable optical polarizing component for switching a polarization state of the laser light directed to the irradiation region between a first polarization state and a second, different, polarization state; and
a support for supporting a semiconductor wafer in a position that is at least partially coincident with the irradiation region.

Other specific aspects and features of the present invention are set out in the accompanying claims.

BRIEF DESCRIPTION OF THE DRAWINGS

The invention will now be described with reference to the accompanying drawings (not to scale), in which.

DETAILED DESCRIPTION OF THE PREFERRED EMBODIMENTS OF THE INVENTION

Figure 1:
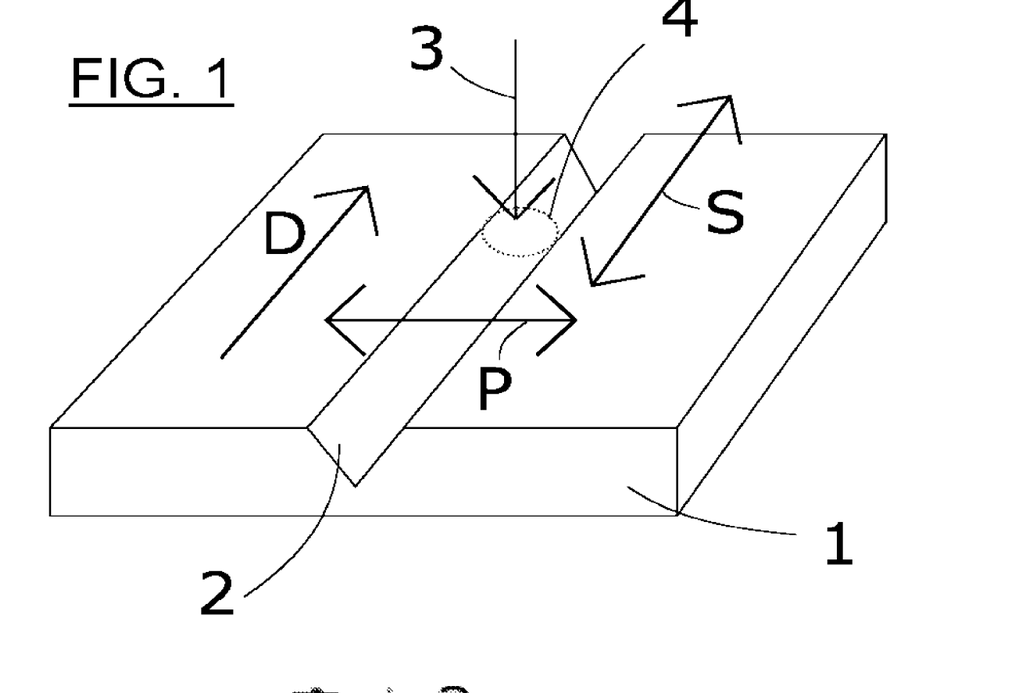
FIG. 1 schematically shows a perspective view of a semiconductor wafer, illustrating laser linear polarization direction with respect to the cutting direction.

FIG. 1 schematically illustrates laser polarization directions. A semiconductor wafer, in this case a planar silicon wafer substrate 1, is shown supported within a laser cutting apparatus (not shown), with a groove 2 formed therein by incident laser light 3, the groove 2 being formed along a predetermined cut line. The laser light 3 is directed so as to be approximately normal to the plane of the substrate 1. In practice, the substrate 1 may be supported at a substantially horizontal orientation, while laser light 3 is directed vertically downwards onto the substrate 1 for example. The laser light 3 acts to ablate semiconductor material within an area, hereafter termed an irradiation region 4. The substrate 1 is therefore supported so that it is coincident with the irradiation region 4, thus the laser light 3 may cut into the substrate 1. A drive (not shown) is provided to relatively move the substrate 1 and the irradiation region 4 in a direction D, such that the irradiation region 4 follows the cut line of the substrate 1, thus cutting the groove 2 during this relative movement. In practice, it is usual to move the substrate 1 while keeping the irradiation region 4 stationary, though other arrangements, such as keeping the substrate 1 stationary while moving the irradiation region 4, or moving both the substrate 1 and the irradiation region 4 are equally possible. It is conventional to cut the groove 2 to the desired depth by performing additional "passes" of the laser light 3 and substrate 1 as required, with each pass ablating more substrate material. If complete singulation is required, then passes may be repeated until the substrate 1 is completely cut through, alternatively the substrate 1 may be singulated by mechanical means once a groove 2 of a sufficient depth has been formed. FIG. 1 shows the substrate 1 after at least one pass has already been performed, hence the groove 2 extending across the entire length of the substrate.

As is well-known per se, laser light may occur in various differing polarization states, including unpolarized/non-polarized, random polarized, linearly-polarized circularly- or elliptically-polarized states or various polarization distributions of electrical field of light across the laser beam cross-section, for instance axial or rotational polarization. Certain types of laser sources, such as solid-state laser sources, emit linearly-polarized laser light. Other types, such as some types of fiber laser sources, emit non-polarized laser light. As shown in FIG. 1, and in keeping with accepted nomenclature, laser light that is linearly polarized along an axis parallel to the cutting direction D will hereafter be designated as being "S-polarized", while laser light that is polarized perpendicularly to cutting direction D will hereafter be designated as being "P-polarized".

Figure 2:
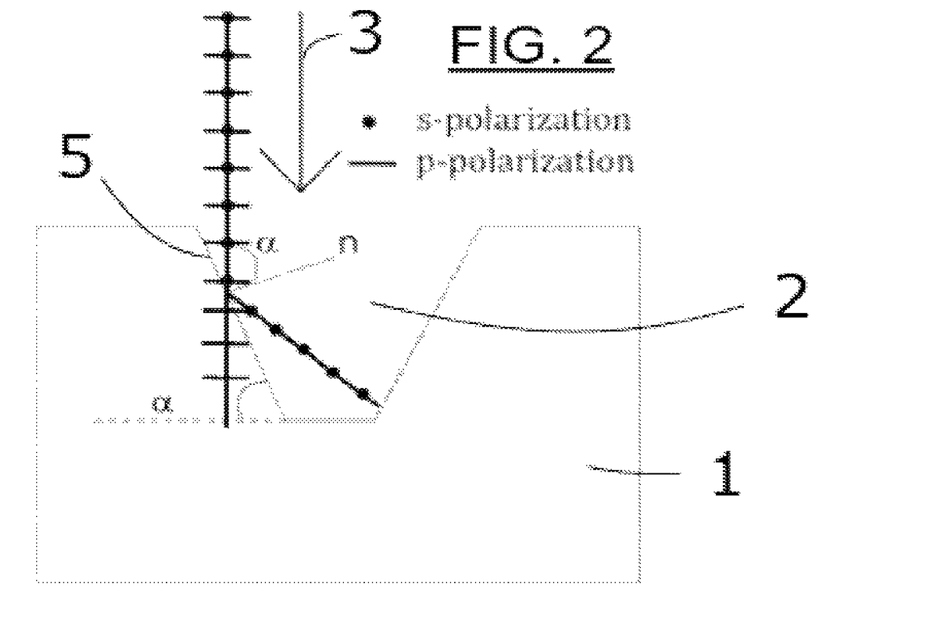
FIG. 2 schematically shows a sectional view of the semiconductor wafer of FIG. 1.

FIG. 2 schematically shows a sectional view of substrate 1 taken in the direction D, and illustrates the effect of polarization on the laser light propagation in the groove 2 upon interaction of the laser light 3 with a sidewall 5 of the groove 2. The laser light 3 is shown as being in a non-polarized state, which can be simplified as a mixture of S- and P-polarization states. The laser light 3 makes an angle of incidence a in the range from about 85° to about 70° to the normal n of the sidewall 5. It follows from Fresnel's equations (see FIG. 3) that at this angle of incidence α, P-polarization has a minimum in reflection, meaning that the laser light 3 with this polarization mostly penetrates into the sidewall 5 where it is absorbed. In contrast, the laser light 3 with S-polarization tends to reflect away from the sidewall 5, towards the base of the groove 2, where it may be absorbed.

Figure 3:
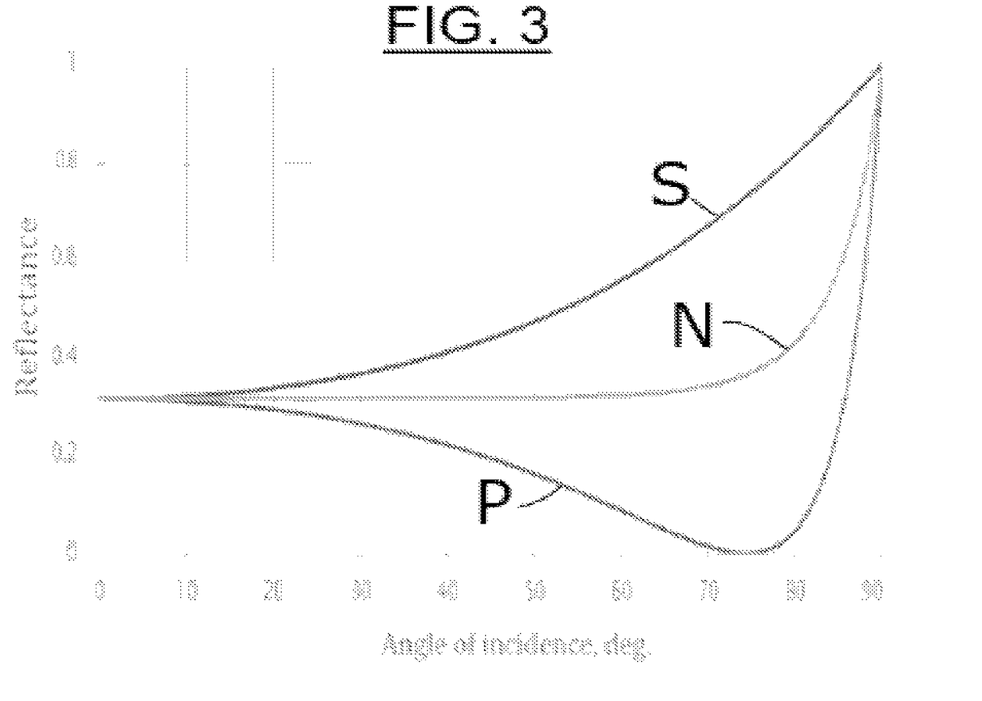
FIG. 3 graphically illustrates reflectance as a function of angle of incidence for different polarization states.

FIG. 3 illustrates how the reflectance of S-polarized (line "S"), P-polarized (line "P") and unpolarized (line "N") laser light varies with angle of incidence α. These plots are derived from Fresnel's equations.

Figure 4:
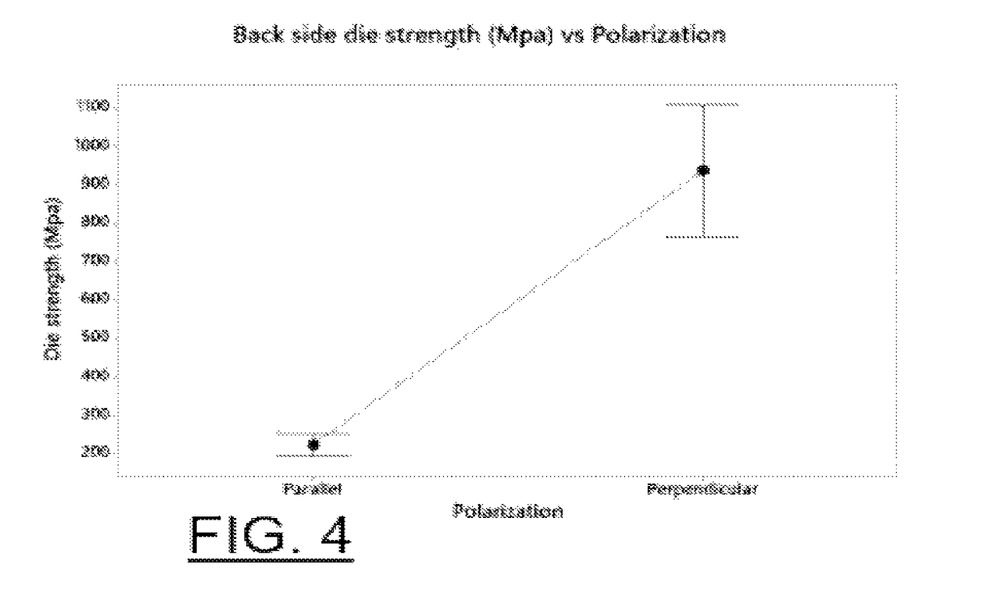
FIG. 4 graphically illustrates back-side die strength as a function of incident polarization.

The concentration of defects present in such a sidewall has been shown to influence the die strength of the sample ("Investigations of the influence of dicing techniques on the strength properties of thin silicon"; Schoenfelder et al, Microelectronics Reliability 47 (2007) 168-178). It has been determined that the absorption of laser energy into the sidewalls of a groove may act to anneal such defects, and therefore increase the die strength. It should be noted that due to the fact that the laser fluence and caustic are different from the front and the back of the workpiece, the die strength is different for the front and the back side of the workpiece. The extent or quality of such annealing heavily depends on parameters of the laser light, including polarization. Therefore, if P-polarized laser light is applied to the substrate during cutting, the greater absorption of the P-polarized laser light (as opposed to S-polarized or non-polarized laser light) into the sidewall 5 would be expected to act to strengthen the die. Indeed, it has been experimentally found that the use of P-polarization significantly increases the back-side die strength of the wafer, which is shown graphically in FIG. 4. This figure plots back-side die strength (Mpa) for the two linear polarizations. It was also found that the top die strength of the workpiece is substantially unaffected by polarization.

Alternative annealing processes include chemical etching, plasma etching or as a combination of all the above methods ("Study of die break strength and heat-affected zone for laser processing of thin silicon wafers"; Daragh et al. Journal of Laser Applications 27, 032004 (2015); doi: 10.2351/1.4916979).

As noted above, S-polarized laser light tends to be reflected towards the base or bottom of the groove 2, and it has been determined that this effect leads to correspondingly increased ablation at the bottom. As such, it has also been found that S-polarized laser light can improve cutting efficiency, i.e. it acts to cut down through the substrate more efficiently. It follows therefore that by tuning or selecting the polarization of the applied laser light, the cutting characteristics of the laser cutting machine may be varied and optimised for a particular application. If a cutting process is used in which the substrate is particularly delicate, then increasing the proportion of P-polarized laser light may be beneficial to provide additional back-side strength. Conversely, if the wafer integrity is less problematic, then use of a higher proportion of S-polarized laser light may act to increase throughput of the machine due to the enhanced cutting characteristics, potentially reducing the number of passes necessary to achieve the desired depth of cut. Alternatively, the superposition of S-polarization and P-polarization either in time or in space can be exploited to achieve compromise in increasing efficiency and the die strength.

Figure 5:
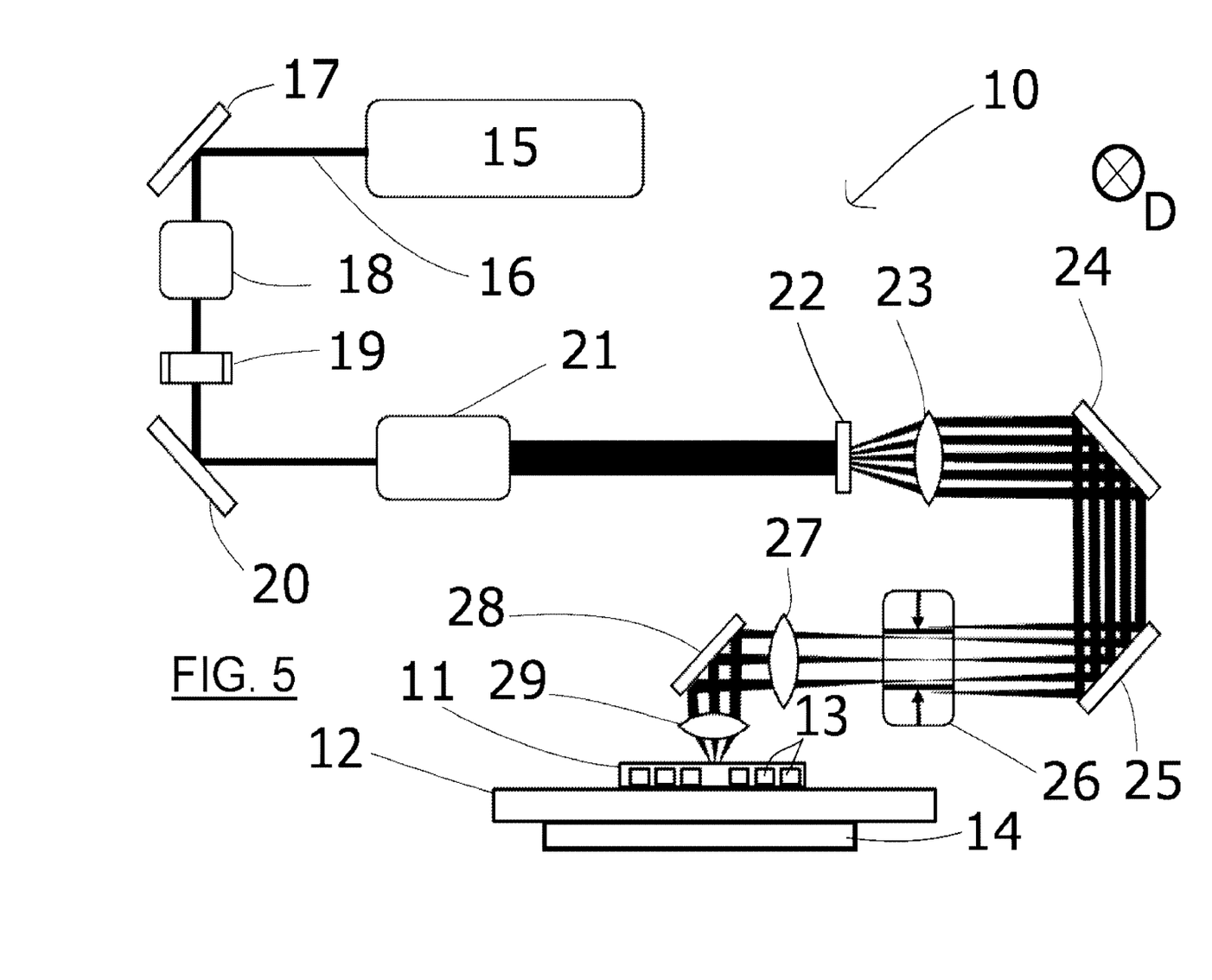
FIG. 5 schematically shows a laser-cutting apparatus in accordance with an embodiment of the present invention.

A laser-cutting apparatus 10 in accordance with an embodiment of the present invention is schematically shown in FIG. 5.

For the sake of example, FIG. 5 shows a semiconductor wafer in the form of a molded wafer 11 supported on a chuck 12. Molded wafer 11 includes a plurality of devices 13, as is known per se in the art. Chuck 12, and hence molded wafer 11, are driven in use by a drive 14, so that there is relative movement between the molded wafer 11 and the applied laser light (see below) in a direction D into the plane of the paper. A laser source 15, here a solid-state laser source, outputs a polarized laser beam 16. This is guided by a mirror 17 to an attenuator/shutter 18 for control of the beam. A selectively actuatable optical polarizing component, here in the form of a motorised half-wave plate 19, is provided to be selectively movable for interaction with the laser beam 16. Preferably the half-wave plate 19 is mounted for rotation around the laser beam axis. If incoming polarization is aligned along the optical axis of the half wave plate the outgoing polarization is unaffected, otherwise the polarization rotates by double the angle between the incoming polarization and the optical axis of the half wave plate Therefore, by selectively rotating half-wave plate 19 the polarization state of the laser beam 16 can be controlled in a switching manner. Alternatively, the half-wave plate 19 may be selectively moved into and out of the laser beam 16, though such an arrangement risks compromising the laser beam alignment, unless movement and positional accuracy can be ensured. Whichever method is used, the selective movement is implemented by controlled operation of the motor by a control means (not shown) such as a computer, processor or the like. Another mirror 20 guides the beam to a beam expander 21 to produce a widened beam. A diffractive optical element or DOE 22 diffracts the widened beam into a predetermined pattern of output laser beams, which are collimated by a lens 23. Further mirrors 24, 25 guide the beams to a spatial filter 26, which is used to form a desirable predetermined beam pattern. A second lens 27 directs the beams onto another mirror 28, which in turn guides the beams to a focusing lens 29. This focuses laser light to the irradiation region (not shown), which is caused to be at least partially coincident with the molded wafer 11 by the supporting chuck 12.

With this apparatus, as noted above the polarization of the laser light reaching the irradiation region can be switched between orthogonal linear polarization states. In the case that the laser source 15 emits an S-polarized laser beam 16, the apparatus 10 could be arranged to, for example, perform both a first and a second pass of the molded wafer 11 with S-polarized laser light, which may lead to initial rapid cutting, and then subsequently a further pass could be performed with P-polarized laser light, which could act to increase die strength of the molded wafer 11 when singulated. Of course, either linear polarization state could be selected for each pass, by appropriate rotation of the half-wave plate 19. Passes may be repeated at least once, and for as many times as required.

In a related embodiment, if the laser source used is a fiber-type laser source, so that it emits a non-polarized laser beam, then it would be necessary to adapt the apparatus described above. In particular, a polarizer would be required, which may be fixed along the path of the laser beam before the half-wave plate, in which case the apparatus would function in a similar manner as that described above with reference to FIG. 5. Alternatively, a movable polarizer may be provided for selective insertion into the path of the laser beam. In this case, the polarization states may be selectively switched between a state of non-polarization (in which the polarizer is not placed in the laser beam path), a first linear polarization state (in which the polarizer is moved into the path and the half-wave plate is at one angle), and a second linear polarization state (in which the polarizer is moved into the path and the half-wave plate is at another angle). It will be apparent that the half-wave plate is optional here, since it is possible, if desired, to switch between two different polarization states without it, i.e. such that the movable polarizer may act as the selectively actuatable optical polarizing component and the first and second polarization states respectively comprise a non-polarized and a single linear polarized state.

It should be noted that optionally, to improve the annealing property of the P-polarized laser beam, additional offset passes, which should be optimized beforehand, can be applied after any cutting passes.

Figure 6:
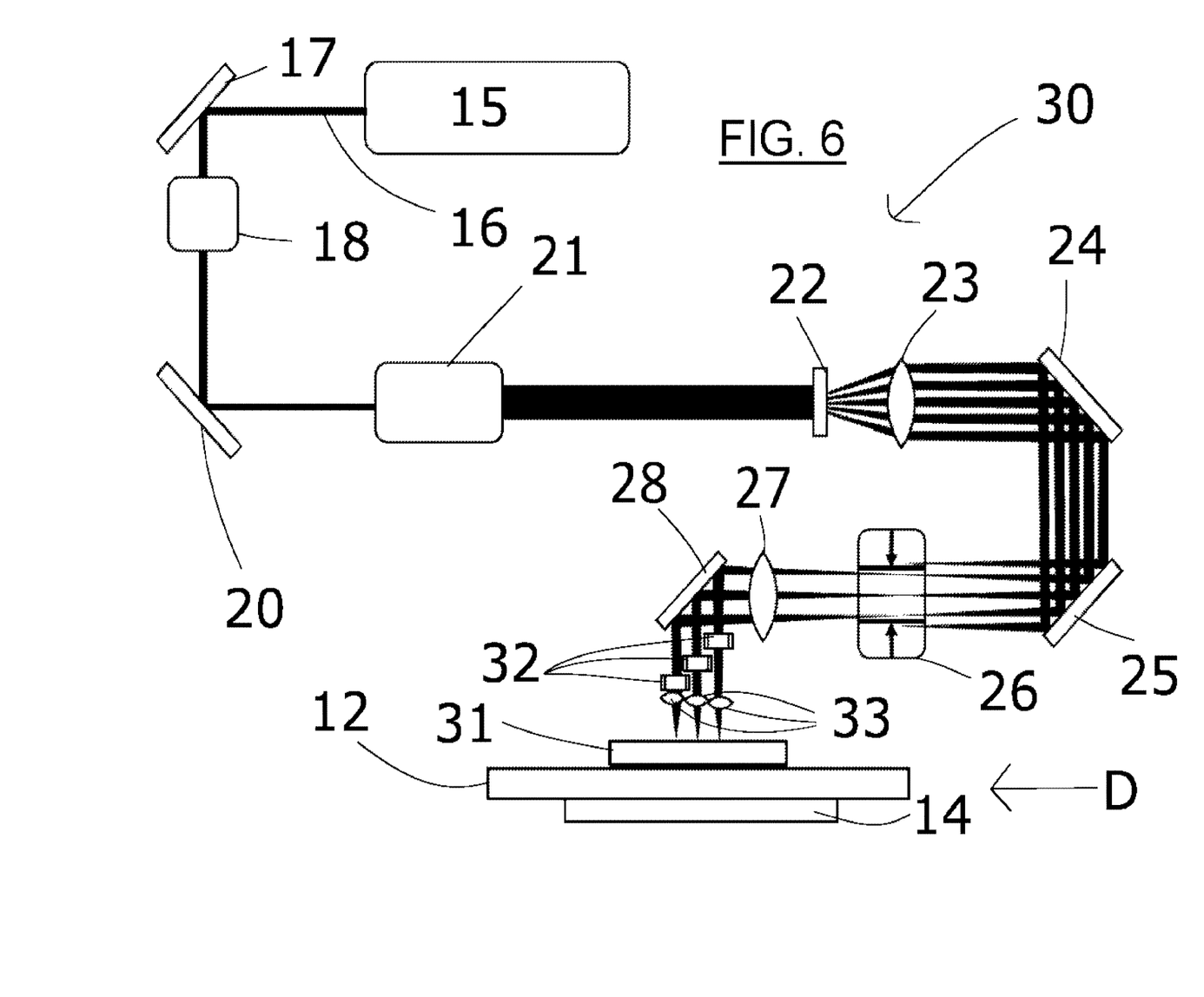
FIG. 6 schematically shows a laser-cutting apparatus in accordance with another embodiment of the present invention.

A laser-cutting apparatus 30 in accordance with another embodiment of the present invention is schematically shown in FIG. 6, being used to cut a semiconductor wafer 31 along a direction of relative movement D running parallel to the plane of the paper. Much of the apparatus 30 is similar to that shown in FIG. 5 and so need not be described in detail. In particular, items 15-18, 20 to 28 are all similar to those of FIG. 5. Apparatus 30 is operable to simultaneously direct an array of spaced individual laser beams to an extended irradiation region (as compared to that of the apparatus of FIG. 5). The individual laser beams of the array are again produced by DOE 22. In contrast to the apparatus of FIG. 5, here the individual beams are directed by mirror 28 via individual respective motorised half-wave plates 32 and individual respective focusing lenses 33 to the extended irradiation region. Each motorised half-wave 32 may be independently and selectively controlled for each individual beam by a control means (not shown) such as a computer, processor or the like.

With apparatus 30, the individual laser beams of the array may therefore be set to supply laser light to the irradiation region of either selected linear polarization state, by suitable movement of the respective motorised half-wave plate 32. By way of example, the left-most beam, which leads the array in the direction of relative movement, may be set to have a first, S-polarization state, while at least one other of the trailing laser beams may be set to have a second, P-polarization state, or vice versa. Since the semiconductor wafer 31 moves in direction D, it can be seen that each point on the cutting line of semiconductor wafer 31 will receive laser light of the first polarization state, and subsequently receive laser light of the second polarization state. As with the previous embodiments, as many passes as required may be performed, with the polarization state for each individual laser beam selected as required for each pass.

If a non-polarizing laser source, such as a fiber laser, is used, then as previously described it will be necessary to use a polarizer in the laser beam light path, which may optionally be selectively controllable for interaction with the laser beam. The individual movable half-wave plates 32 may therefore be replaced by such movable polarizers, or alternatively a movable or fixed polarizer may be used "upstream" of the half-wave plates 32, i.e. in the laser path closer to the laser source.

When using the apparatuses as described above, it will be apparent that full benefit will be obtained if an optimum polarization state for the laser light to achieve cutting is determined initially, with the polarization selection selected in accordance with this determination. Factors to consider may include the wafer material, thickness, width of cutting tracks, desired throughput etc.

Ensuring proper calibration of the polarizations is important for maximising the benefit of the present invention. Ideally, such calibration would be performed at an initial stage, and repeated after regular intervals. The calibration can be performed in several ways. In a preferred method, the operator may perform full polarimetry measurements to find all polarizations required at the end of the optical path after focusing on the workpiece. Calibration may be achieved by using a polarizing birefringent prism, such as a Rochon prism, Wollaston prism, Sénarmont prism, Normanski prism or similar, as would be understood by those skilled in the art. This approach enables the direction of the polarization with respect to the cut to be determined.

Figure 7:
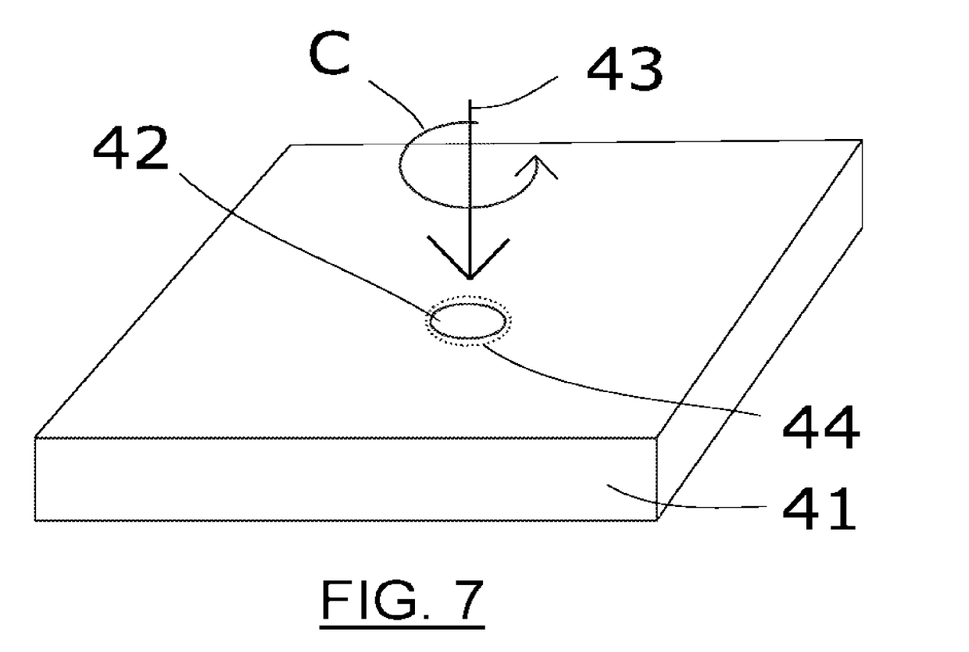
FIG. 7 schematically shows a perspective view of a semiconductor wafer during a drilling process.

Alternative embodiments of the present invention relate to a different form of cutting, i.e. drilling into a semiconductor wafer. As schematically shown in FIG. 7, by keeping the irradiation region 44 of applied laser light 43 fixed with respect to a semiconductor wafer 41, a hole 42 may be formed. In accordance with the present invention, it has been determined that such drilling may be improved by the use of a state of circular polarization, as shown at C. As is well-known, a point of the semiconductor wafer 41 within the irradiation region 44 will experience a time-varying polarization, i.e. the polarization at any instant will be linear, while at a subsequent instant the polarization will be linear but in an angularly-rotated direction. Therefore, circularly-polarized laser light will act to uniformly anneal defects within a sidewall of the hole in a controllable manner.

Figure 8:
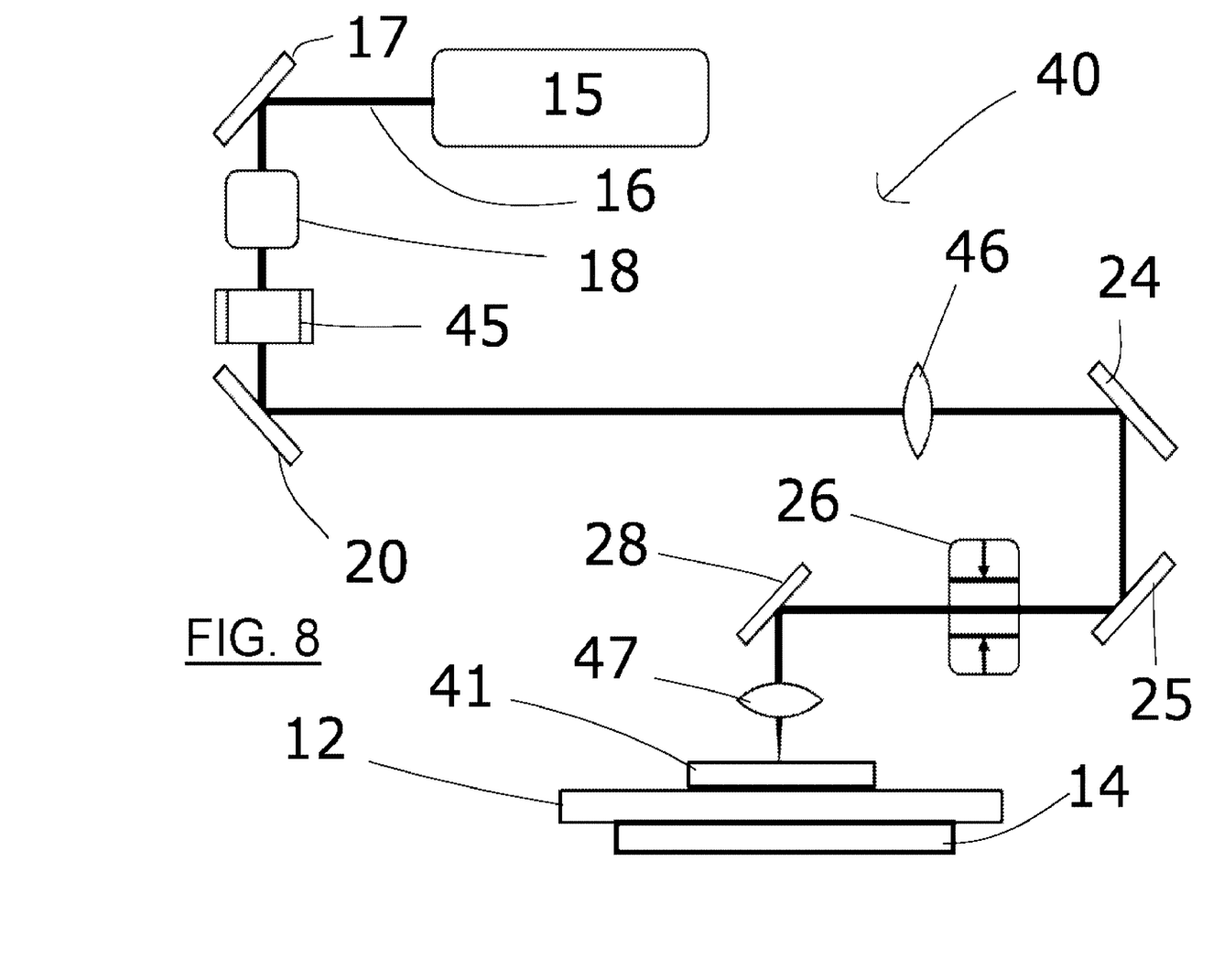
FIG. 8 schematically shows a laser-cutting apparatus in accordance with a further embodiment of the present invention.

A laser-cutting apparatus 40 in accordance with another embodiment of the present invention for performing such a drilling operation is schematically shown in FIG. 8. Much of the apparatus 40 is similar to that shown in FIG. 5 and so need not be described in detail. In particular, items 12, 14 to 18, 20, 24 to 26 and 28 are all similar to those of FIG. 5. Apparatus 40 is operable to direct circularly-polarized light to an irradiation region (not shown), coincident with a semiconductor wafer 41 supported on a chuck 12. To create the circular polarization, a quarter-wave plate 45 is positioned along the optical path of laser beam 16, as shown between attenuator/shutter 18 and mirror 20. No DOE is necessary in this embodiment, but lens 46, which is optionally located after mirror 20, may provide focusing of the laser beam if required. After the laser beam passes through spatial filter 26 it is directed by mirror 28 towards the semiconductor wafer 41, with lens 47 focusing the beam to the irradiation region.

The above-described embodiments are exemplary only, and other possibilities and alternatives within the scope of the invention will be apparent to those skilled in the art.

For example, while the embodiments shown in FIGS. 5 and 6 refer exclusively to the application of laser light having linear polarization states, it is also possible to make use of laser light having circular or elliptical polarization states. Circular polarization can also be used, since this is equivalent to the time superposition of the two orthogonal linear polarizations. To obtain laser light having circular polarization, linearly polarized light (either as a single beam or as multiple beams) may be passed through a quarter wave plate with its fast axis oriented at 45 degrees with respect to the linear polarization azimuth.

Additionally and/or alternatively, laser light having an elliptical polarization state can also be used for cutting. In this case, a polarization ellipse with a major axis perpendicular to the side wall will act in a similar manner to the linear P-polarization, whereas a polarization ellipse with a major axis parallel to the side wall will act in a similar manner to the linear S-polarization. Elliptical polarization may be obtained using half- and quarter-waveplates together in the linearly polarized laser beam input instead of the single half-wave plate shown in FIGS. 5 and 6. In this way, the half-wave plate controls the major ellipse axis orientation while the quarter-wave plate controls the amount of ellipticity. Alternatively, a motorized Babinet Soleil Compensator can be used to achieve the same performance, as will be apparent to those skilled in the art.

REFERENCE NUMERALS

1—Silicon wafer substrate
2—Groove
3, 43—Laser light
4, 44—Irradiation region
5—Sidewall
10, 30—Laser cutting apparatus
11—Molded wafer
12—Chuck
13—Devices
14—Drive
15—Laser source
16—Laser beam
17, 20, 24, 25, 28—Mirrors
18—Attenuator/shutter
19—Motorised half-wave plate
21—Beam expander
22—Diffractive optical element
23, 27, 29—Lens
26—Spatial filter
31, 41—Semiconductor wafer
32—Individual half-wave plates
33—Individual lenses
40—Laser drilling apparatus
42—Hole D—Direction of relative movement
S—Polarization parallel to the direction of relative movement
P—Polarization perpendicular to the direction of relative movement
C—Direction of circular polarization

The invention claimed is:

1. A method of cutting a semiconductor wafer, comprising the steps of:
   a) providing a laser source for directing laser light to an irradiation region of a laser cutting apparatus,
   b) supporting the semiconductor wafer within the laser cutting apparatus such that the irradiation region is coincident with a point on a cut line of the semiconductor wafer,
   c) cutting the semiconductor wafer along the cut line by irradiating the irradiation region of the semiconductor wafer with laser light having a first polarization state and relatively moving the semiconductor wafer and the irradiation region in a direction parallel to the plane of the semiconductor wafer such that the irradiation region follows the cut line of the wafer, so that the semiconductor wafer is cut along the cut line to form a groove; and
   annealing the cut semiconductor wafer by subsequently irradiating the irradiation region of the semiconductor wafer with laser light having a second polarization state that is different from the first polarization state and relatively moving the semiconductor wafer and the irradiation region in a direction parallel to the plane of the semiconductor wafer such that the irradiation region follows the cut line of the wafer, so that the semiconductor wafer is annealed along the cut line.

2. The method of claim 1, wherein the first polarization state comprises one of the group consisting of: linear polarization perpendicular to the direction of relative movement, linear polarization parallel to the direction of relative movement, circular polarization, elliptical polarization and non-polarization.

3. The method of claim 1, wherein the second polarization state comprises one of the group consisting of: linear polarization perpendicular to the direction of relative movement, linear polarization parallel to the direction of relative movement, circular polarization, elliptical polarization and non-polarization.

4. The method of claim 1, wherein step c) is repeated at least once.

5. The method of claim 1, wherein the laser source produces an array of laser beams, each laser beam of the array being directed to a different respective part of the irradiation region, and at least a first laser beam of the array has the first polarization state and at least one other laser beam of the array, which trails the first beam in the direction of relative movement, has the second polarization state.

6. The method of claim 1, comprising an initial step of determining an optimum polarization state for the laser light to achieve cutting, and in step c), polarizing the laser light to the first polarization state in accordance with the determined optimum polarization state.

* * * * *